United States Patent [19]

Loisel

[11] Patent Number: 4,969,678
[45] Date of Patent: Nov. 13, 1990

[54] CAMPING ACCESSORY FOR A MOTOR VEHICLE

[76] Inventor: Yves Loisel, 13 rue du Paquier, 74000 Annecy, France

[21] Appl. No.: 415,609

[22] Filed: Oct. 2, 1989

[30] Foreign Application Priority Data

Oct. 3, 1988 [FR] France ............................... 88 13503

[51] Int. Cl.$^5$ ............................................. B62D 33/04
[52] U.S. Cl. ................................. 296/24.1; 296/37.16;
296/165; 296/174; 224/281; 224/42.01;
224/42.44
[58] Field of Search .................... 296/26, 24.1, 37.16,
296/37.1, 164, 165, 174; 224/281, 282, 42.01,
42.42, 42.43, 42.44

[56] References Cited

U.S. PATENT DOCUMENTS

| 2,329,419 | 9/1943 | Reed ................................. 296/26 X |
| 2,867,471 | 1/1959 | Coon ......................... 224/42.42 R X |
| 3,004,678 | 10/1961 | Golaski ........................ 224/42.01 X |
| 3,292,970 | 12/1966 | Wilson . |
| 3,404,818 | 10/1968 | Miscor ............................... 224/42.42 |
| 4,089,554 | 5/1978 | Myers .................................. 296/24.1 |
| 4,303,367 | 12/1981 | Bott ................................. 224/281 X |

FOREIGN PATENT DOCUMENTS

| 0229556 | 12/1986 | European Pat. Off. . |
| 3127473 | 1/1983 | Fed. Rep. of Germany ..... 296/37.1 |
| 8631206 | 6/1987 | Fed. Rep. of Germany . |
| 2047635 | 12/1980 | United Kingdom ............... 296/24.1 |
| 8202175 | 7/1982 | World Int. Prop. O. . |

Primary Examiner—Johnny D. Cherry
Assistant Examiner—Gary C. Hoge
Attorney, Agent, or Firm—Oliff & Berridge

[57] ABSTRACT

An accessory for a roomy vehicle includes a box designed to be accommodated at the rear of the vehicle. A bottom panel is connected with two side walls, which are in turn connected togehter by three tubes at the level of the top of the box. The latter can be closed by articulated lids capable of forming, with a panel capable of being mounted in removable fashion on the front of the box, a horizontal sleeping plane.

20 Claims, 3 Drawing Sheets

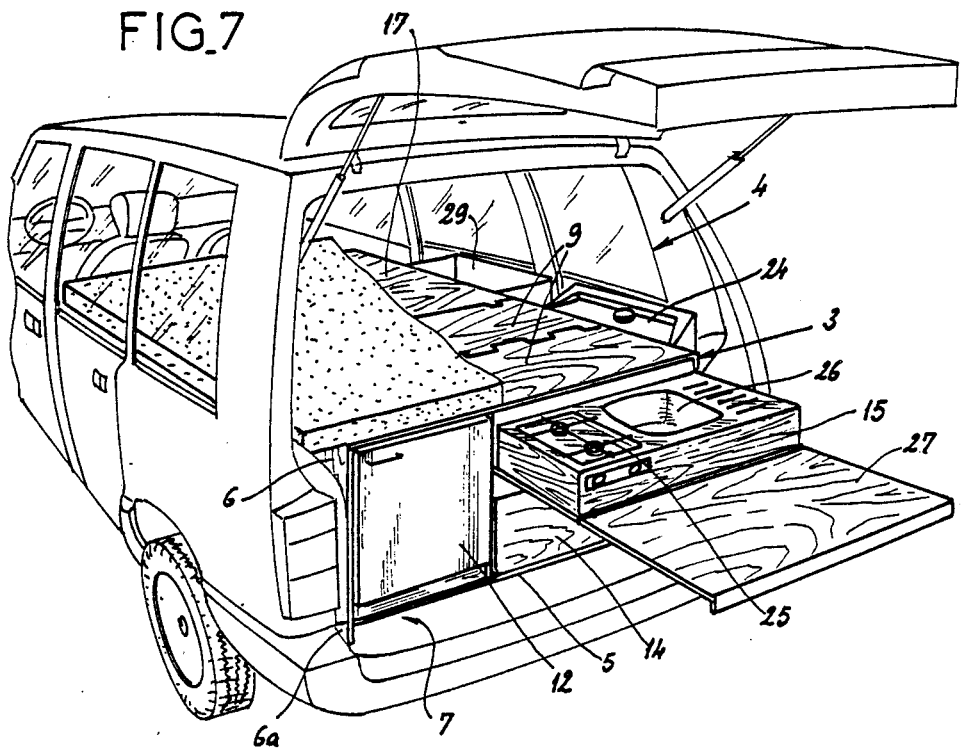
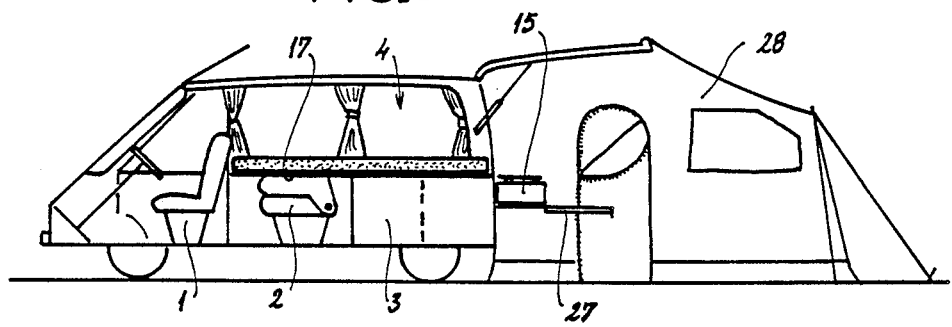
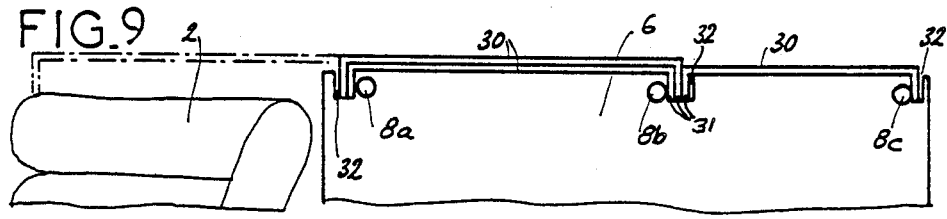

CAMPING ACCESSORY FOR A MOTOR VEHICLE

TECHNICAL FIELD

The present invention relates to an accessory, especially for trips or vacations, for a roomy vehicle like that sold under the name "Renault Espace."

BACKGROUND

A vehicle of this kind may be equipped with a row of rear seats, generally three in number, which are folding and can occupy one of two longitudinal positions:

a "forward" position in which these rear seats are located immediately behind the front seats, at a sufficient distance therefrom to allow the rear passengers to sit, a "rear" position in which these rear seats are located further behind these front seats. In addition, the dimensions of the vehicle are such that, when this row of rear seats is in the "forward" position, it is possible to place behind them another row of rear seats, generally comprising two seats, in order to produce a family vehicle.

These known vehicles have a relatively wide interior space, and it is unfortunate that this wide space cannot provide a space to lie down during vacations or trips.

To overcome this disadvantage, applicant has already developed an accessory for such a vehicle, described in his French patent application No. 87 11173. This device is composed of two removable boxes whose width essentially corresponds to the inside width of the vehicle. The first box is designed to form a container which normally remains permanently in the vehicle, while the second box is designed to be located in the free space left between the first box and the row of rear seats in the "forward" position, with the two boxes being closed on the top by two contiguous horizontal panels. In addition, there is provided at least one flat panel which can articulate on the front upper edge of the second box so as to form, with the two horizontal panels, a horizontal plane for lying down when the seats in the row in the "forward" position are folded.

With only the first box in place, these arrangements allow seven persons to be carried. However, such a possibility is unrealistic within the framework of using a vehicle at a campsite because of the lack of sufficient space for seven persons with baggage.

In addition, the applicant has found that the structure of the internal accessory was relatively complicated and therefore inconvenient to operate.

In addition, this device did not make maximum use of the interior space of the vehicle.

SUMMARY OF THE INVENTION

An aim of the present invention is to overcome these disadvantages. It relates to an accessory for a roomy motor vehicle like that defined above, composed of a single box with a generally parallelepipedic shape designed to be mounted within a volume delimited at the rear by a hatchback of the vehicle and at the front by a row of rear seats in the "forward" position. It comprises a bottom panel resting on the floor of the vehicle and integral with two lateral walls connected at the level of the upper surface of the box by at least three transverse tubular elements parallel to one another (i.e. a front element, a middle element, and a rear element). The upper surface of the box is closable by means for closing and lying down.

This embodiment of the device in the form of a single box gives the assembly considerable sturdiness and lightness so that it can easily be handled by only two persons. The tubular elements of the box also provide a good grip for the hand. Its parallelepipedic shape delimits a very large useful interior volume for providing accessories and/or for storage.

BRIEF DESCRIPTION OF THE DRAWINGS

The invention will be better understood and its advantages will be more apparent from the following description, with reference to the attached schematic diagrams which show, as a non-limiting example, a preferred embodiment of the accessory for roomy vehicles, in which:

FIG. 7 is a rear perspective view showing the vehicle partially cut away and at rest, equipped with the device shown in FIG. 4 in the lying-down position with its kitchen module and table ready to use;

FIG. 8 is a simplified side view of the vehicle in FIG. 7, also provided with a canopy;

FIG. 9 is a schematic diagram in the form of a partial longitudinal section through one embodiment of the lying-down means and means for closing the top surface of the box.

DETAILED DESCRIPTION OF PREFERRED EMBODIMENTS

According to one advantageous feature of the invention, the box is equipped with support means to elevate it so as to provide a space between its bottom panel and the floor of the vehicle, when it is placed in the latter.

According to a preferred embodiment of the device, the means for closing and lying down are composed of two rectangular lids articulated on the middle tubular element. In addition to these means, there is a rectangular plate which, in the operating position, can be fixed in a removable fashion by its rear edge overhanging the front tubular element of the box so as to define, with these means for closing and lying down, a lying-down plane that is essentially horizontal when the seats in the row in the "forward" position are folded. When not in the operating position, this rectangular plate is capable of being placed in the space provided to receive it between the bottom panel of the box and the floor of the vehicle.

These articulated lids permit easy access to the interior of the box, while the rectangular panel which is convenient to use provides a surface for lying down which is roomy and stable.

According to one embodiment, the means for closing and lying down on the top surface of the box are composed of at least three rectangular panels which can be superimposed at least partially on each other and immobilized relative to the box by at least partial engagement on the tubular elements and/or notches provided in the upper edges of the lateral sides of the box. These superimposable panels are capable of being located side by side so as to cover the top surface of the box as well as the storage space for the row of rear seats, and thus to define a plane for lying down which is essentially horizontal when the rear seats are folded.

Advantageously, the superimposable rectangular panels are made of ABS plastic and are each provided with two longitudinal reinforcing ribs that run transversely relative to the vehicle axis.

Figure 1:
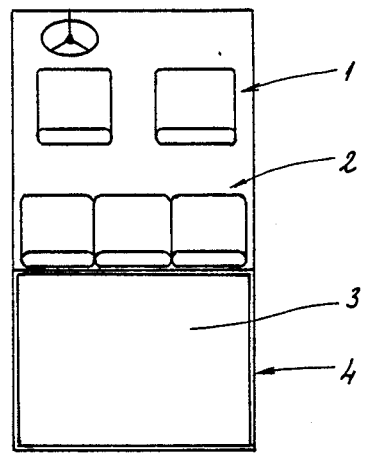
FIG. 1 is a simplified top view of the vehicle showing the row of three rear seats in the "forward" position and the box in place.
Figure 2:
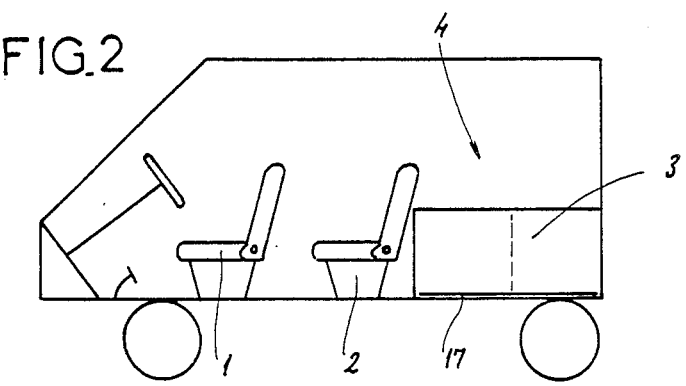
FIG. 2 is a simplified side view of the vehicle in FIG. 1 with the accessory in the travel position.

FIG. 1 shows a roomy vehicle in which the device according to the invention can be installed. In this case, it is the type sold under the trademark Renault Espace.

A vehicle of this kind is equipped with a row of front seats 1, generally comprising two seats, as well as one row of rear seats 2, numbering three in the example shown, which can be folded as is often the case for rear seats of vehicles, and which can occupy two longitudinal positions.

a forward position (FIG. 1) in which rear seats 2 are located immediately behind front seats 1, at a sufficient distance from the latter to allow the passengers to sit;

a rear position (not shown in the drawing) in which rear seats 2 are located further behind front seats 1, consequently leaving a wide space in front of rear seats 2; by pivoting front seats 1 through 180°, the rear of the vehicle is transformed into a room.

In addition, it is possible, when rear seats 2 are in their forward position, to locate behind them another row of rear seats so as to produce a family vehicle with seven seats.

As FIGS. 1 to 4 show, the single box 3 of the accessory of the invention fits into the volume 4 delimited by the row of rear seats 2 in the "forward" position and by the hatchback of the vehicle, not numbered, when it is in the closed position. It is generally parallelepipedic in shape and has a width slightly less than the internal width of the vehicle. This box 3 is composed of a rectangular bottom panel 5 each of whose transverse edges parallel to the axis of the vehicle is attached integrally to a side wall 6. Bottom panel 5 is tilted slightly upward relative to lower edges 6a of the two side walls 6 intended to rest on the floor of the vehicle so as to define with the latter a space 7 whose purpose will be explained below. Three transverse tubes 8, parallel to one another, made of metal or the like, specifically one front tube 8a, one middle tube 8b, and one rear tube 8c, integrally connect the two side walls 6 at the level of the top of box 3. Box 3 is closed by two rectangular lids 9, identical to one another and each articulated, by one of its longitudinal edges, to pivot around middle tube 8b. Each of these two lids 9 perfectly covers one-half of the top of box 3 and can be opened by pivoting around tube 8b to provide access to the inside of box 3. They also have a horizontal plane capable of supporting heavy loads.

Box 3 is open at the front as well as at the rear. An internal partition 10, parallel to the axis of the vehicle, delimits two compartments 11a, 11b. One compartment 11a is designed to receive, at its rear portion, a refrigerator 12 while its front portion provides a free space 13 to accommodate baggage or the like.

The other compartment 11b has, at its rear part, a lower storage drawer 14, sliding between a retracted position inside box 3 and an extended position outside the latter, and having a cut-off corner 14a so as to accommodate, inside box 3, a space designed to hold a gas cylinder. Immediately above this drawer 14 is a kitchen module 15, also slidably mounted, and described in greater detail below. Free space 16 delimited by the front part of the compartment 11b is intended for storage, like volume 13.

The two rectangular lids 9 constitute the means for closing and for lying down on the top surface of box 3. They are capable, in order to put the accessory in the sleeping position, of being associated with a rectangular panel 17 equipped, along its rear longitudinal edge, with at least two connecting claws 18 which allow it to be mounted over front tube 8a of box 3.

Figure 5:
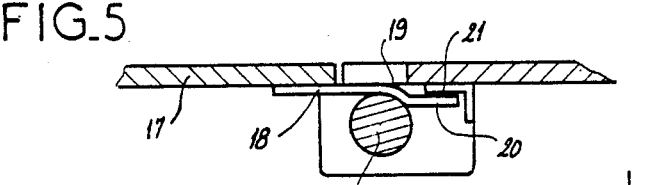
FIG. 5 is a section along line V—V in FIG. 4.

As shown in FIG. 5, this connecting claw 18 has a shoulder 19 which rests on and abuts a portion of the contour of front tube 8a, while its free end 20 is engaged in a stop 21 which prevents it from moving upward.

Figure 3:
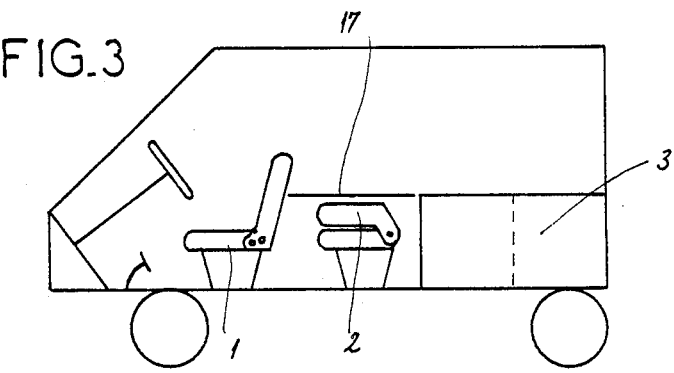
FIG. 3 is a view similar to FIG. 2 with the accessory in the lying-down position.
Figure 4:
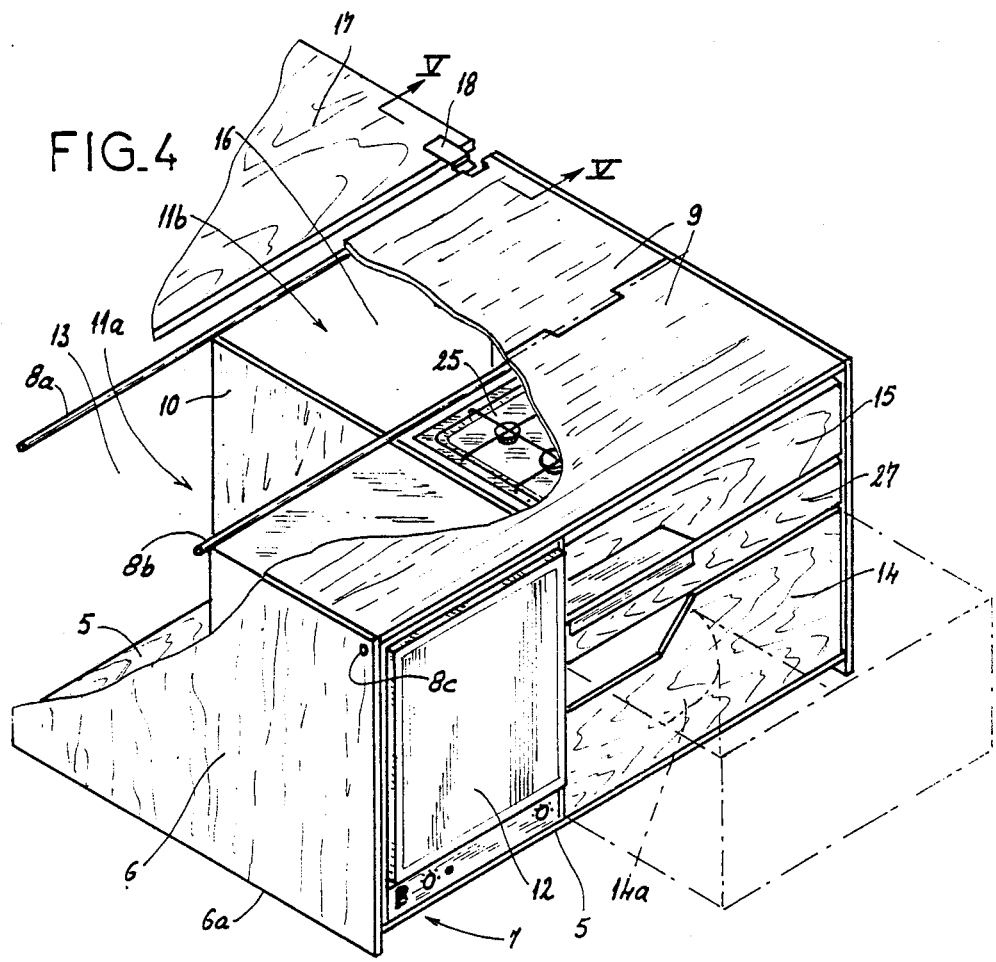
FIG. 4 is a perspective view of the accessory alone.

The height of the box 3 is such that rectangular panel 17 thus fixed abuts rear seats 2 when they are in the "forward" position, after, of course, having been previously folded, i.e. their backs have been tilted forward as shown in FIGS. 3 and 8.

Folding retaining legs may also be provided, mounted at the front of panel 17 and capable of abutting the floor of the vehicle so as to improve, if necessary, the stability of said panel 17. This arrangement can permit elimination of rear seats 2 and thus increase the available free space.

The assembly composed of lids 9 and floor 17 thus forms a continuous horizontal sleeping surface on which a mattress can be placed (FIGS. 3 and 8).

Installation and removal of rectangular panel 17 on box 3 is easy. When not in use, it is stored in space 7 between bottom panel 5 and the floor of the vehicle and is therefore not in the way when the device is in the travel position.

Figure 6:
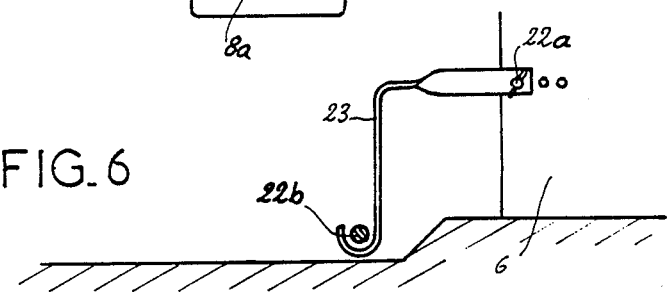
FIG. 6 is a longitudinal section showing the means for mounting the box inside the vehicle.

FIG. 6 shows a means for rapidly attaching box 3 to the interior of the vehicle. Each of side walls 6 is connected by means of a bolt 22a fitted with a wing nut to a hooking element 23 whose free end, in the form of a hook, is designed to engage a pin 22b intended for holding the corresponding side rear seat 2 to the vehicle chassis, or to another part of the vehicle. Several holes with no reference numbers and designed to receive bolt 22 are provided in each of walls 6. They allow the longitudinal position of box 3 inside the vehicle to be adjusted and thus to provide free space either in front of or behind box 3.

FIG. 8 shows, in more detailed fashion, the vehicle at rest and set up for both sleeping and cooking.

Box 3 is accommodated between the two rear wheel wells of the vehicle. In the vicinity of each of said wells, side wall 6 of box 3 and the side wall of the vehicle define a space able to receive, for example, a tank of drinking water 24 and/or a storage container 29, slidably mounted on side wall 6 and held relative to the latter by means of a wing nut not shown in FIG. 7.

Compartment 11b of the box may comprise, in its rear upper region, a sliding kitchen module 15 consisting of a gas stove 25 supplied by a gas cylinder located in the space defined by cut-off corner 14a of drawer 14 and a sink 26 whose water supply comes from tanks 24 which can be used alternatively by means of a switch (not shown). Advantageously, the pipes bringing the water from tanks 24 to sink 26 are located inside middle tube 8b.

Beneath kitchen module 15 may be a sliding table 27 which can be moved between a retracted position and an extended position (FIG. 7).

As indicated in FIG. 8, the accessory according to the invention may be associated with the open hatchback of the vehicle, thus forming a protective roof and with a canopy 28 which advantageously adds to the space available for camping.

FIG. 9 shows an embodiment in which the means for lying down and closing the top surface of box 3 are composed of three rectangular panels 30 whose longitudinal edges, transverse to the axis of the vehicle, are recurved by 90° so as to form reinforcing ribs 31. In the travel position, two of these panels 30 are superimposed and engaged by their ribs 31, on both front tube 8a and middle tube 8b of the box, and by their ends in notches 32 provided in the top edges of side walls 6 of box 3, while the remaining rectangular panel 30 is located side by side and engaged in the same fashion with rear tube 8c and notches 32.

In the sleeping position, one of panels 30 covering the top surface of the box is placed in contact with folded rear seats 2, while its rear reinforcing rib 31 is engaged in notches 32 in walls 6 in the vicinity of the front upper edge of box 3.

This provides a horizontal plane for sleeping.

The materials used to make the various parts of this accessory can be made completely of an appropriate material, namely wood, plastic of the ABS type, metal, etc.

Moreover, as far as the embodiment is concerned, side walls 6 and bottom panel 5 can be hollow so that the box can be fitted over the wheel wells; rectangular panel 17 can be made in several parts that fold onto one another, the cross tubes can be more or less in number, and can have a shape other than cylindrical. The arrangement of the interior space of the box can also be different.

What is claimed is:

1. An accessory to a roomy motor vehicle capable of being equipped with at least one row of rear seats with substantial space behind said row of rear seats, comprising a box with a generally parallelepipedic shape, so structured as to be encloseable in a volume delimited at a rear end of said box by a hatchback of the vehicle and at a front end of said box by said row of foldable rear seats, said box comprising a top, two side walls and a bottom integral with said two side walls, said two side walls being connected together at the level of the top of the box by at least three tubular elements including a front element, a middle element and a rear element that extend transversely and are parallel to one another, said at least three tubular elements constituting a means for closing the top of said box by at least partial engagement of the top with said tubular members 2. An accessory according to claim 1, wherein said box is equipped with support means for raising said box to provide a space between said bottom and the floor of the vehicle when said box is placed in said vehicle.

3. An accessory according to claim 1, wherein said top comprises two rectangular lids articulated on said middle tubular element, said accessory further comprising a rectangular panel which has a rear edge and which is structured to be mountable in removable fashion by said rear edge overhanging said front tubular element of said box so as to define, with said top in an operating position, a sleeping plane essentially horizontal when said row of rear seats is folded.

4. An accessory according to claim 2, wherein said top comprises two rectangular lids articulated on said middle tubular element, said accessory further comprising a rectangular panel which has a rear edge and which is structured to be mountable in removable fashion by said rear edge overhanging said front tubular element of said box so as to define, with said top in an operating position, a sleeping plane essentially horizontal when said row of rear seats is folded, said rectangular panel, when not in the operating position, being structured to fit in said space between said bottom of said box and the floor of the vehicle.

5. An accessory according to claim 1, wherein said top comprises at least three rectangular panels superimposable at least partially on one another and immobilized relative to said box by at least partial engagement with at least one member selected from the group consisting of said tubular elements and notches provided in top edges of said side walls of said box, said superimposable panels being capable of being located side by side so as to cover said box and said row of rear seats, thus defining a sleeping plane that is essentially horizontal.

6. An accessory according to claim 5, wherein said rectangular superimposable panels are each provided with two longitudinal reinforcing ribs running transversely relative to a longitudinal axis of the vehicle.

7. An accessory according to claim 6, wherein said rectangular superimposable panels are made of ABS plastic.

8. An accessory according to claim 1, wherein said box is structured to be installed inside the vehicle by mounting means for rapid attachment.

9. An accessory according to claim 8, wherein said mounting means comprises a hooking element having two ends, said hooking element being connected at one end to said box and having a hook shape at its other end for engaging with a pin attached to said vehicle.

10. An accessory according to claim 9, wherein said one end of said hooking element is connected to said box by means of a bolt and a wing nut.

11. An accessory according to claim 1, wherein said box comprises an internal partition parallel to a longitudinal axis of said vehicle and defining two compartments within said box.

12. An accessory according to claim 11, wherein said two compartments each include a rear part and a forward part, one said compartment being structured to receive, at its rear part, a refrigerator while its forward part provides a free space, the other compartment having in its rear part a lower drawer and a sliding kitchen module located immediately above said lower drawer, and having in its forward part a free space.

13. An accessory according to claim 12, wherein said kitchen module comprises a gas stove, a sink supplied with water from at least one tank, and a table slidable between a retracted position and an extended position relative to said kitchen module.

14. An accessory according to claim 13, wherein said box is structured to accommodate a water tank located above a wheel well of the vehicle in a space delimited by a side wall of said box and by a side wall of the vehicle, and said box further comprises a storage container slidably mounted on said side wall of said box and so structured as to fit into said space with said tank.

15. An accessory according to claim 13, wherein said lower drawer has a cut-off corner defining a space for receiving a gas cylinder to supply said gas stove.

16. An accessory for a roomy motor vehicle capable of being equipped with at least one row of rear seats with substantial space behind said row of rear seats, comprising a box with a generally parallelepipedic shape, so structured as to be enclosable in a volume delimited at a rear end of said box by a hatchback of the vehicle and at a front end of said box by said row of foldable rear seats, said box comprising a top, two side walls and a bottom integral with said two side walls, said two side walls being connected together at the level of the top of the box by at least two elements including a front element and a rear element that extend transversely and are parallel to one another, with the top of said box forming a substantially planar surface, a planar member positionable to extend from the top over and in direct contact with the foldable rear seats and means for supporting a portion of the planar member at a front edge portion of the box adjacent said top.

17. An accessory according to claim 16, wherein said box is equipped with support means for raising siad box to provide a space between said bottom and the floor of the vehicle, when said box is placed in said vehicle, for receiving said planar member.

18. An accessory according to claim 16, wherein said box includes a middle transverse connecting element intermediate of and parallel to the front and back transverse elements, said top comprises two rectangular lids articulated on said middle transverse element, and said planar member comprises a rectangular panel which has a rear edge and which is structured to be mountable in removable fashion by said rear edge overhanging said front element of said box so as to define, with said top in an operating position, a sleeping plane essentially horizontal when said row of rear seats is folded.

19. An accessory according to claim 17, wherein said box includes a middle transverse connecting element intermediate of and parallel to the front and back transverse elements, said top comprises two rectangular lids articulated on said middle element, and said planar member comprises a rectangular panel which has a rear edge and which is structured to be mountable in removable fashion by said rear edge overhanging said front transverse element of said box so as to define, with said top in an operating position, a sleeping plane essentially horizontal when said row of rear seats is folded.

20. An accessory according to claim 16, wherein said box includes a middle transverse connecting element intermediate of and parallel to the front and back transverse elements and said top and planar member comprise at least three rectangular panels superimposable at least partially on one another and immobilized relative to said box by at least partial engagement with at least one member selected from the group consisting of said transverse elements and notches provided in top edges of said side walls of said box, said superimposable panels being capable of being located side by side so as to cover said box and said row of rear seats, thus defining a sleeping plane that is essentially horizontally.

* * * * *